(12) United States Patent
Farkash et al.

(10) Patent No.: US 6,757,847 B1
(45) Date of Patent: Jun. 29, 2004

(54) SYNCHRONIZATION FOR SYSTEM ANALYSIS

(75) Inventors: Monica Farkash, Haifa (IL); Danny Geist, Haifa (IL); Raanan Gewirtzman, Haifa (IL); Karen Holtz, Neve Shaanan (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/472,779

(22) Filed: Dec. 27, 1999

(30) Foreign Application Priority Data

Dec. 29, 1998 (EP) ............................................. 98480099

(51) Int. Cl.[7] .............................................. H02H 3/05
(52) U.S. Cl. ........................................ 714/39; 714/12
(58) Field of Search ............................... 714/39, 12, 6, 714/11, 13, 707, 775

(56) References Cited

U.S. PATENT DOCUMENTS

| | | | | |
|---|---|---|---|---|
| 4,833,638 A | * | 5/1989 | Vollaro ........................ | 709/400 |
| 5,159,686 A | * | 10/1992 | Chastain et al. ............ | 709/105 |
| 5,313,620 A | * | 5/1994 | Cohen et al. ................ | 709/400 |
| 5,682,480 A | * | 10/1997 | Nakagawa .................... | 712/28 |
| 5,784,630 A | * | 7/1998 | Saito et al. .................... | 712/30 |
| 5,796,946 A | * | 8/1998 | Sakon .......................... | 709/248 |
| 5,968,160 A | * | 10/1999 | Saito et al. .................... | 712/14 |

OTHER PUBLICATIONS

Fast Parallel Processor Notification, IBM Technical Disclosure Bulletin, Sep. 1st, 1988, vol. 31, Issue 4, pp. 48–52.*
Parallel Equi–Join Algorithm for Large Relational Data Base operations, IBM Tech. Discl. Bulletin, Oct. 1st, 1987, vol. 30, Issue 5, pp. 361–365.*

* cited by examiner

*Primary Examiner*—Dieu-Minh Le
(74) *Attorney, Agent, or Firm*—Scully, Scott, Murphy & Presser; Richard M. Ludwin

(57) ABSTRACT

A synchronization method including running (10) a system (725) having multiple agents (730) in parallel operation and forcing synchronization order (20, 30, 40, 50) between the multiple agents at at least one intervention juncture. Preferably, the multiple agents (730) include at least two agents (570, 590) accessing a single address at almost the same time. Further preferably, the forcing step includes forcing a predetermined one (570) of said two agents to access said address before the other one (590) of said two agents accesses said address.

25 Claims, 13 Drawing Sheets

FIG. 10

| | WAITING | SIGNALING | LIMITATION |
|---|---|---|---|
| REGISTER METHOD | CPU LOOPS FOR A REGISTER VALUE | SC CHANGING THE VALUE OF THE CPU REGISTER | PROCESSOR ONLY |
| BUS ARBITRATION METHOD | WAIT FOR ARBITRATION GRANT | SC CHANGING THE VALUE OF THE ARBITRATION CONTROL | TECHNICAL DIFFICULTIES |
| ENABLE BIT | WAIT FOR ENABLE BIT/ACTION | SC CHANGING THE VALUE OF THE ENABLE BIT (OR ACTION) | BEHAVIORALS ONLY |
| CONFIGURATION | WAIT FOR ENABLE BIT/ACTION | THE PROCESSOR EXECUTES A CONFIGURATION CYCLE THAT ENABLES THE DEVICE | BEHAVORALS/ DEVICES WITH CONFIGURATION CYCLES |
| SEMAPHORES | WAIT AT A SEMAPHORE | THE LEADING PROCESSOR RELEASES THE SEMAPHORE | PROCESSOR ONLY |

SYNCHRONIZATION FOR SYSTEM ANALYSIS

BACKGROUND OF THE INVENTION

1. Technical Field

The present invention relates to apparatus and methods for analyzing a computer system.

2. Prior Art

The state of the art in system verification and related technologies is represented by the following documents:

[1] A. Aharon, D Goodman, M. Levinger, Y. Lichtenstein, Y. Malka, C. Metzger, M. Molcho, and G. Shurek. Test program generation for functional verification of PowerPC processors in IBM. In $32^{nd}$ Design Automation Conference, DAC 95, pages 279–285, 1995.

[2] Y. Lichtenstein, Y. Malka, and A. Aharon. Model-based test generation for processor design verification. In Innovative Applications of Artificial Intelligence (IAAI). AAAI Press, 1994.

[3] Published European Patent Application No. 84303181.5 (Publication No. 0 628 911 A2) to International Business Machines Corporation.

[4] D. Marr, S. Thakkar and R. Zucker. Multiprocessor Validation of the Pentium Pro Microprocessor, Proceedings of the COMPCON'96

[5] J. Walter et al., Hierarchical Random Simulation Approach for the Verification of S/390 CMOS Multiprocessors, Proceedings of the DAC'97 (pages: 89–94)

[6] K. Hines and G. Borriello. Dynamic Communication Models in Embedded System Co-Simulation, Proceedings of the DAC'97 (pages:395–400)

[7] M. Bauer and W. Ecker. Hardware/Software Co-Simulation in a VHDL-based Test Bench Approach, Proceedings of the DAC'97 (pages:774–779)

[8] U.S. Pat. No. 5,740,353 to Kreulen et al.

The disclosures of all publications mentioned in the specification and of the publications cited therein are hereby incorporated by reference.

SUMMARY OF THE INVENTION

The present invention seeks to provide improved apparatus and methods for system analysis.

Analysis can be understood to include verification, testing, debugging and performance analysis. The application of synchronization in system verification is now described in detail.

Hardware system verification is an integral, important activity in the development of every new computer system.

The target of system verification is to clean the design from functional errors, called bugs, before manufacturing begins. System design errors may originate from different sources: inconsistent interfaces between the system components can be the result of separate design efforts; errors may escape from the process of verifying a component of the system; other reasons exist for system errors. Overall, the target of system verification is to verify whether the design of the system complies with its specification. It is important that system verification exposes such errors before the system is manufactured, as the cost of correcting a bug after manufacturing can become very high.

One method used for hardware system verification is simulation of a system model. Each system model is composed of the designs of the system components. In addition, behavioral units may be added to the model in order to simulate the behavior of system components such as peripherals.

Verification of system behavior is achieved by simulation of test programs. System test programs are composed of the execution threads for each of the system components. These system tests can be automatically generated by an automatic test generation tool. (Documents 1 and 2 listed above in the Background section describe a test generation tool for a single processor.)

System simulation models can become very large, including: several processors, several bus bridges, memory controllers and I/O bus behaviorals. The simulation of tests on such a model is time consuming. A good verification coverage cannot be obtained by mere massive simulation of many random tests. A method for increasing the quality of system tests is to force interesting sequences of events by synchronizing between different system components. Furthermore, good coverage can be obtained by testing all possible orderings of a single set of events. This can be achieved by using the synchronization method described in this invention.

System verification is based on test-programs, which are rather complex. Compared to the test-programs used in processor verification, system test-programs require the synchronization of different, independent system components. System activity is determined by a set of distributed protocols, which exhibit a lack of central control. The sequence in which the system components interact is test-variant. Good coverage of the verification-plan is obtained by different sequence combinations. And thus, the ability to control the synchronization of the system components during a test is important for efficient system verification.

System verification may be based on automatic test-program generation. The input to an automatic test-program generation tool may comprise a list of test generation directives and the output may comprise a test-program which includes the initialization and execution directives to all system components, as well as expected results. Test synchronization should be integrated into the test generation methodology in order to utilize the productivity of design-automation tools. Furthermore, test synchronization should provide the flexibility to control the delay between the synchronized system components. Short delays increase the contentions between system activities and eventually lead to the detection of design errors.

Several methods exist for implementing synchronizations among agents. The following features are important for a preferred synchronization method:

Fast speed—As few cycles as possible between the signaling event and the pending transaction. Experience shows that the smaller the synchronization delay, the higher the chances are for resource contention. In other words, the time it takes for the waiting agent to start executing the pending transaction after the signaling event is critical to achieve tight interaction.

Generic Applicability—Usability by different types of agents, including non-initiating system components, e.g., memory controllers.

Conventional testing systems depend on the type of the component they target. There are synchronization mechanisms developed for processors, and there are techniques applicable to different behaviorals, depending on the specifics of each of them, e.g. system verification: [Documents 4 and 5 listed above in the Background sections; handshake synchronization: [Document 6]; master synchronizer: [Document 7].

The present invention seeks to provide a method for synchronization which generally achieves the shortest time possible between the signaling event and the pending transaction; and also can be used with processors, I/O devices and non-initiating system components that have access to a bus. This is an efficient, strong synchronization method for use in bus-based systems. A preferred embodiment of the present invention seeks to provide a method for synchronization by means of controlling bus arbitration. This embodiment preferably comprises a SC (synchronization controller) program.

The system of the present invention may be used during normal multi-component system operation. One preferred embodiment of the present invention comprises a technique to improve verification quality. Verification typically comprises about 50% of the design effort of a new system, resulting in costs of billions of dollars. The synchronization technique described herein targets resource contention, an area notorious for containing design bugs and very hard to simulate in random verification. One objective of a preferred embodiment of the present invention is, therefore, to make system verification efforts more efficient by targeting problem areas in a limited amount of simulation time.

A particular feature of a preferred embodiment of the present invention is that the synchronization provided thereby can be described on the architectural level but works as well at any implementation level synchronization. It can be used with generally any bus protocol that uses bus arbitration to control bus transaction order.

Typically, this invention employs simulators that provide an API to external code that can poll and change simulation signals during simulation. Modern simulators such as ModelSim/VHDL and Synopsis VHDL System Simulation (VSS), commercially available from Model Technology Inc. and Synopsis Inc. respectively, have this capability. The method is general enough to apply to a wide range of system verification problems in which the bus protocol uses arbitration, as most bus protocols today do.

The arbitration synchronization mechanism of the present invention is suitable, for example, for AS/400 and RS/6000 system verification, as well as for the verification of other devices that sit on a bus such as an L2 cache-controller.

Bus arbitration synchronization is, in at least some applications, the fastest non-intrusive way to release an agent connected to a bus. Possible applications for bus arbitration synchronization include the following:

a. A synchronization controller which is used in the automation of the system verification process;

b. Manual testing process, to detect bugs in the design.

c. Manual debugging process to identify causes for malfunction in a design.

d. Performance analysis including all methods for evaluating expected performance of a given design of a hardware system. For example, the bus arbitration synchronization of the present invention can be used to establish a given level of bus utilization in the evaluated system.

The synchronization scheme shown and described herein is very useful in system testing to achieve control of sequences. As the complexity of designed systems grows in the number of components and functionality, the emphasis of verification increasingly moves towards system verification, enhancing the usefulness of arbitration synchronization as a sophisticated method in system testing.

Terminology:

Agent (or Device)—A system component that is attached to a bus. The component is able to request arbitration on the bus (address and/or data buses) and then to be the bus master for a bus tenure. For example, a processor can be the bus master for an address tenure on a split address/data bus, and also for write data tenures. On the other hand, a memory controller can only be the bus master for read data tenures.

Agent Type—For example, PowerPC 603 processor, PCI device.

Arbitration—When there are several system components attached to a bus, a mechanism is used for assuring that two system components do not write to the bus at the same time. This mechanism is known as arbitration and is enforced by the use of an arbiter system component also attached to the bus. Frequently, each system component on the bus requests access to the bus via request lines, and is granted access to the bus via grant lines.

Arrival at the Station—A point in time at which the waiting agent has completed the transaction before the pending transaction and therefore is on the verge of executing its pending transaction.

Behavioral—Behaviorals are used during system verification to simulate the behavior of peripheral (I/O) devices, or to take on the role of extra agents that are not real designs.

Bus—A bus serves as a shared communication link among system components over which addresses and data are passed.

Initiating agent—An agent that may place an address on its associated bus.

Non-initiating agent—An agent that never places an address on its associated bus, but may be the supplier of data on the bus.

Reference Model—A reference model for a system predicts the effect certain inputs have on the system state. By use of reference models during test generation, the generator can estimate the current state of the system resources that are interesting to the test.

Event—A certain occurrence of a significant bus/agent state during simulation run time. (e.g. the occurrence of an address-phase in a PCI bus.)

Signaling agent/device—Agent at which an event ("signaling event") is to occur which will serve as a condition for operation of another agent (termed "waiting agent" or "pending agent"). Until signaling event occurs at signaling agent, operation of waiting/pending agent is held up.

Synchronization—Synchronization preserves the ordering of a sequence of events. For example, synchronization can be used to force one agent to write to address A only after another agent has completed its access to A. The agent that waits is referred to as the waiting (or pending) agent/device. The waiting agent does not continue its execution until a predetermined event occurs which is termed the signaling event. Once the signaling event occurs, the waiting agent's pending transaction executes.

Synchronization Controller (SC)—The purpose of a synchronization controller is to ensure a given sequence of events. During simulation, the existence of a simulation control program that runs concurrently with the simulation is assumed. This program, the synchronization controller (SC), is able to monitor the current system state and also to enforce synchronizations among agents. The SC has the ability to monitor system signals and also to force a system signal to change to a new specific value.

Test generator—A process that generates tests in order to be simulated for the purpose of verification.

Tight snooping—This is any event sequence in which two agents access the same system resource, e.g., memory location, close in time.

Time—In this invention disclosure, it is assumed that time is measured in terms of simulation—or clock—cycles.

Transaction—For the purposes of this invention disclosure, a transaction is defined as any operation of an agent that is reflected on the agent's external interface to the rest of the system model.

Tenure—A bus tenure is an interval of time in which one type of information is placed on the bus. For example, during a processor read from memory, there will be 2 tenures, an address tenure and a data tenure. During the address tenure, the processor will place the address on the bus. During the data tenure, the memory controller will place the requested data on the bus.

De-asserted—de-activated.

Eieio—The PowerPC architecture specification includes the eieio instruction (see "PowerPC 601 RISC Microprocessor User's Manual", 1993). This instruction results in an eieio transaction on the bus. Eieio is used in the present specification simply as an example of an instruction that results in a bus transaction that does not appear on the bus for any other purpose during the test simulation. The requirement is for a dedicated bus transaction that the synchronization controller is able to interpret as a signal to it from a waiting agent that is ready for its pending transaction.

There is thus provided in accordance with a preferred embodiment of the present invention a synchronization method including running a system having multiple agents in parallel operation, and forcing synchronization order between the multiple agents at at least one intervention juncture.

Further in accordance with a preferred embodiment of the present invention the multiple agents include at least two agents accessing a single address at almost the same time and wherein the forcing step includes forcing a predetermined one of the two agents to access the address before the other one of the two agents accesses the address.

Still further in accordance with a preferred embodiment of the present invention the multiple agents include first and second agents and wherein the forcing step includes forcing order between the first and second agents at a first intervention juncture, and wherein the multiple agents include third and fourth agents, at least one of which differs from the first and second agents, and wherein the forcing step also includes forcing order between the third and fourth agents at a second intervention juncture which is different from the first intervention juncture.

Still further in accordance with a preferred embodiment of the present invention the multiple agents include a plurality of threads on an individual processor.

Additionally in accordance with a preferred embodiment of the present invention the multiple agents include at least three agents in parallel operation at at least one intervention juncture.

Further in accordance with a preferred embodiment of the present invention the multiple agents include at least one signaling agents executing at least one signaling events and at least one waiting agents executing at least one pending transactions, and wherein the forcing step includes holding up operation of the at least one waiting agents until the at least one signaling agents execute the at least one signaling events.

Still further in accordance with a preferred embodiment of the present invention the at least one signaling events include a plurality of signaling events and wherein the forcing step includes holding up operation of the at least one waiting agents until the plurality of signaling events have been executed.

Additionally in accordance with a preferred embodiment of the present invention the at least one pending transactions include a plurality of pending transactions and wherein the forcing step includes delaying the plurality of pending transactions until the at least one signaling events have been executed.

Further in accordance with a preferred embodiment of the present invention the three agents include a first agent accessing an address which accessing operation must occur before a second agent and a third agent access the same cache line generally simultaneously.

Still further in accordance with a preferred embodiment of the present invention the multiple agents in parallel operation are operative to fill at least one buffer of a bus bridge.

Additionally in accordance with a preferred embodiment of the present invention the multiple agents in parallel operation are operative to fill at least one buffer of a memory controller.

There is also provided, in accordance with another preferred embodiment of the present invention, synchronization apparatus including a system manipulator operative to run a system having multiple agents in parallel operation, and an order imposer operative to force synchronization order between the multiple agents at at least one intervention juncture.

Additionally in accordance with a preferred embodiment of the present invention the multiple agents participate in a plurality of events and the forcing step includes forcing the plurality of events to occur in all possible orders.

Further in accordance with a preferred embodiment of the present invention the at least one signaling agents include a plurality of signaling agents executing at least one signaling events and wherein the forcing step includes holding up operation of the at least one waiting agents until the plurality of signaling agents executes the at least one signaling events.

Still further in accordance with a preferred embodiment of the present invention the at least one waiting agents includes a plurality of waiting agents and wherein the forcing step includes holding up operation of the plurality of waiting agents until the at least one signaling agents execute the at least one signaling event.

There is also provided, in accordance with another preferred embodiment of the present invention, a synchronization method including running a system having multiple agents in parallel operation, the multiple agents each having at least one path to a common bus, and using a bus arbitration mechanism to synchronize between the multiple agents in accordance with a predetermined scheme, including blocking at least one individual agent's path to the common bus if the scheme indicates that the individual agent is not to be activated, and restoring the at least one individual agent's path to the common bus once the scheme indicates that the individual agent can be activated.

Further in accordance with a preferred embodiment of the present invention the multiple agents include a plurality of processors.

Still further in accordance with a preferred embodiment of the present invention the multiple agents include at least one processor and at least one I/O unit.

Additionally in accordance with a preferred embodiment of the present invention the multiple agents include at least one agent having a path onto the common bus via at least one intermediate bus.

Further in accordance with a preferred embodiment of the present invention the using step is performed externally to and therefore independently of the internal structure of each of the agents.

Still further in accordance with a preferred embodiment of the present invention the using step includes forcing architectural signals.

Additionally in accordance with a preferred embodiment of the present invention the multiple agents include at least two agents accessing a single address at almost the same time and wherein the using step includes forcing a predetermined one of the two agents to access the address before the other one of the two agents accesses the address.

Further in accordance with a preferred embodiment of the present invention the multiple agents include first and second agents and wherein the using step includes forcing order between the first and second agents at a first intervention juncture, and wherein the multiple agents include third and fourth agents, at least one of which differs from the first and second agents, and wherein the using step also includes forcing order between the third and fourth agents at a second intervention juncture which is different from the first intervention juncture.

Still further in accordance with a preferred embodiment of the present invention the multiple agents are operative to fill at least one buffer of a memory controller and wherein the using step includes preventing the memory controller from accessing the common bus.

Additionally in accordance with a preferred embodiment of the present invention the multiple agents are operative to fill at least one buffer of a bus bridge and wherein the using step includes preventing the bus bridge from accessing the common bus.

There is further provided, in accordance with another preferred embodiment of the present invention, a synchronization apparatus including a system manipulator operative to run a system having multiple agents in parallel operation, the multiple agents each having at least one path to a common bus, and a bus arbitration mechanism operative to synchronize between the multiple agents in accordance with a predetermined scheme, including blocking at least one individual agent's path to the common bus if the scheme indicates that the individual agent is not to be activated, and restoring the at least one individual agent's path to the common bus once the scheme indicates that the individual agent can be activated.

Further in accordance with a preferred embodiment of the present invention the system manipulator includes a system simulator operative to simulate the system.

Still further in accordance with a preferred embodiment of the present invention the system manipulator includes a performance analyzer operative to conduct a performance analysis of the system.

Additionally in accordance with a preferred embodiment of the present invention the system manipulator includes a system verifier operative to verify the system.

Further in accordance with a preferred embodiment of the present invention the system manipulator includes a system debugger operative to debug the system.

Still further in accordance with a preferred embodiment of the present invention the running step includes simulating the system.

Additionally in accordance with a preferred embodiment of the present invention the running step includes conducting a performance analysis of the system.

Further in accordance with a preferred embodiment of the present invention the running step includes verifying the system.

Additionally in accordance with a preferred embodiment of the present invention the running step includes debugging the system.

BRIEF DESCRIPTION OF THE DRAWINGS AND APPENDIX

Preferred embodiments of the present invention will now be described, by way of example only, with reference to the accompanying drawings and appendix in which:

FIG. 10 is a table comparing synchronization control methods constructed and operative in accordance with five different embodiments of the present invention which differ mainly with respect to implementation of the "wait" and "signal" steps of FIG. 1;

Figure 14:
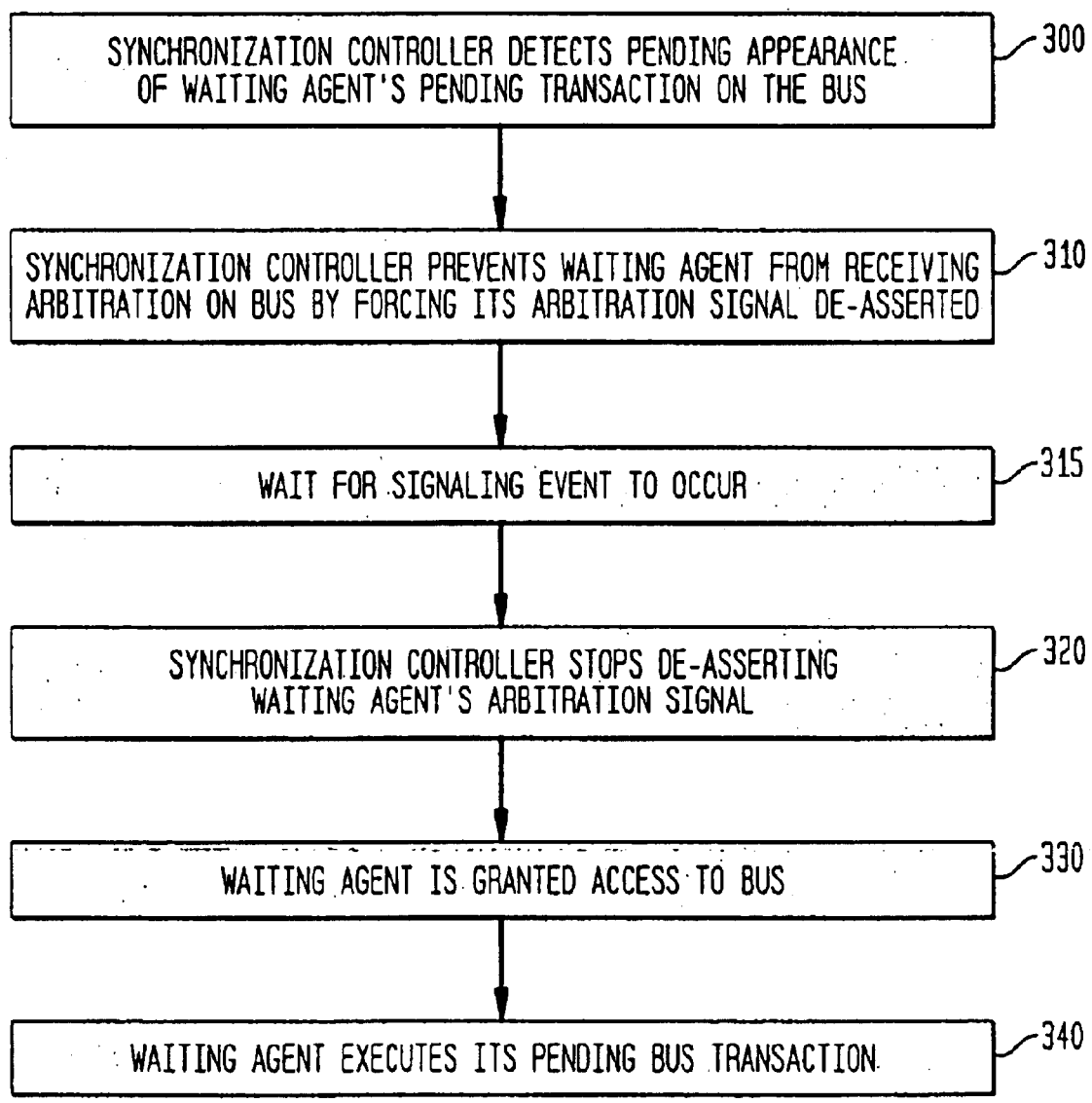
Figure 15:
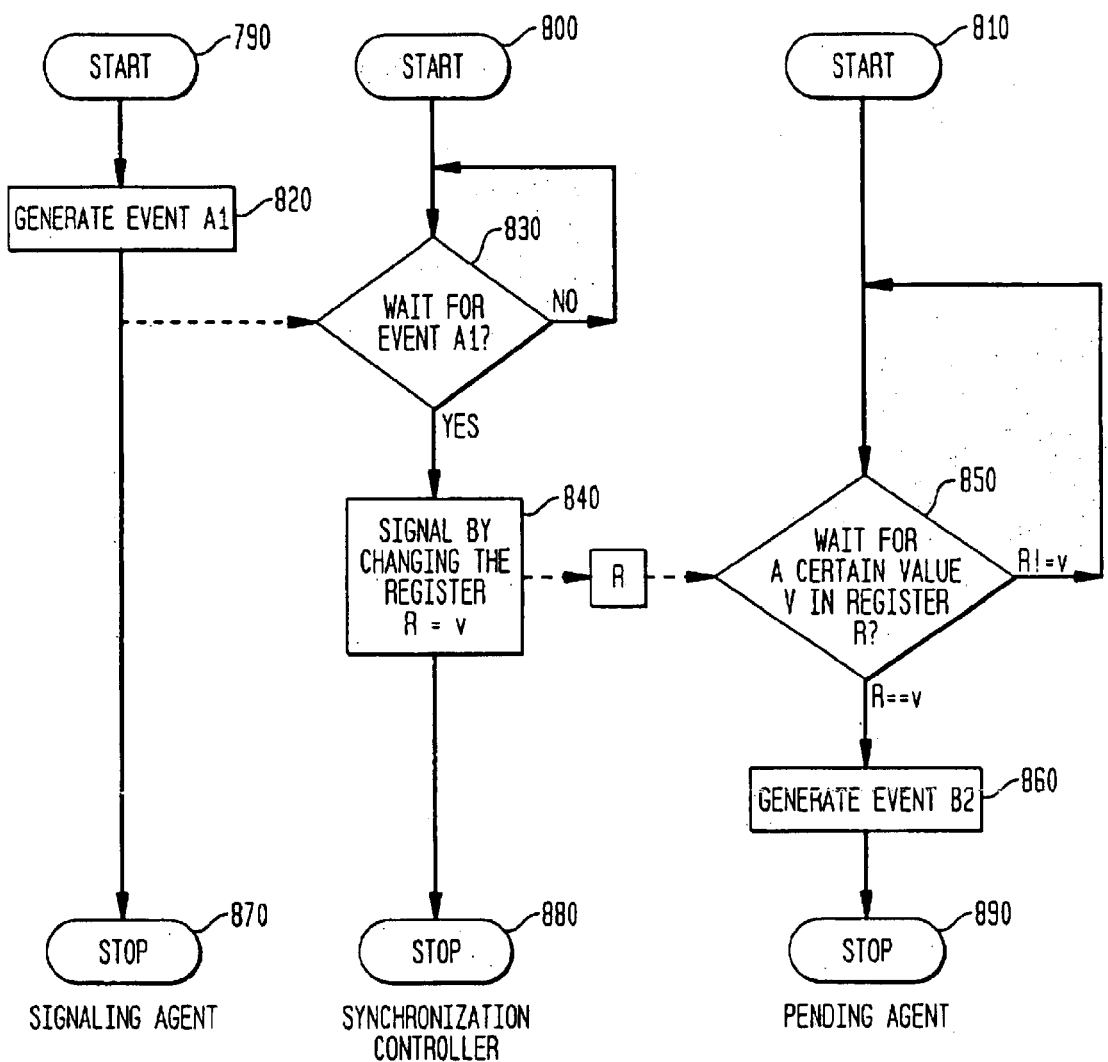
Figure 16:
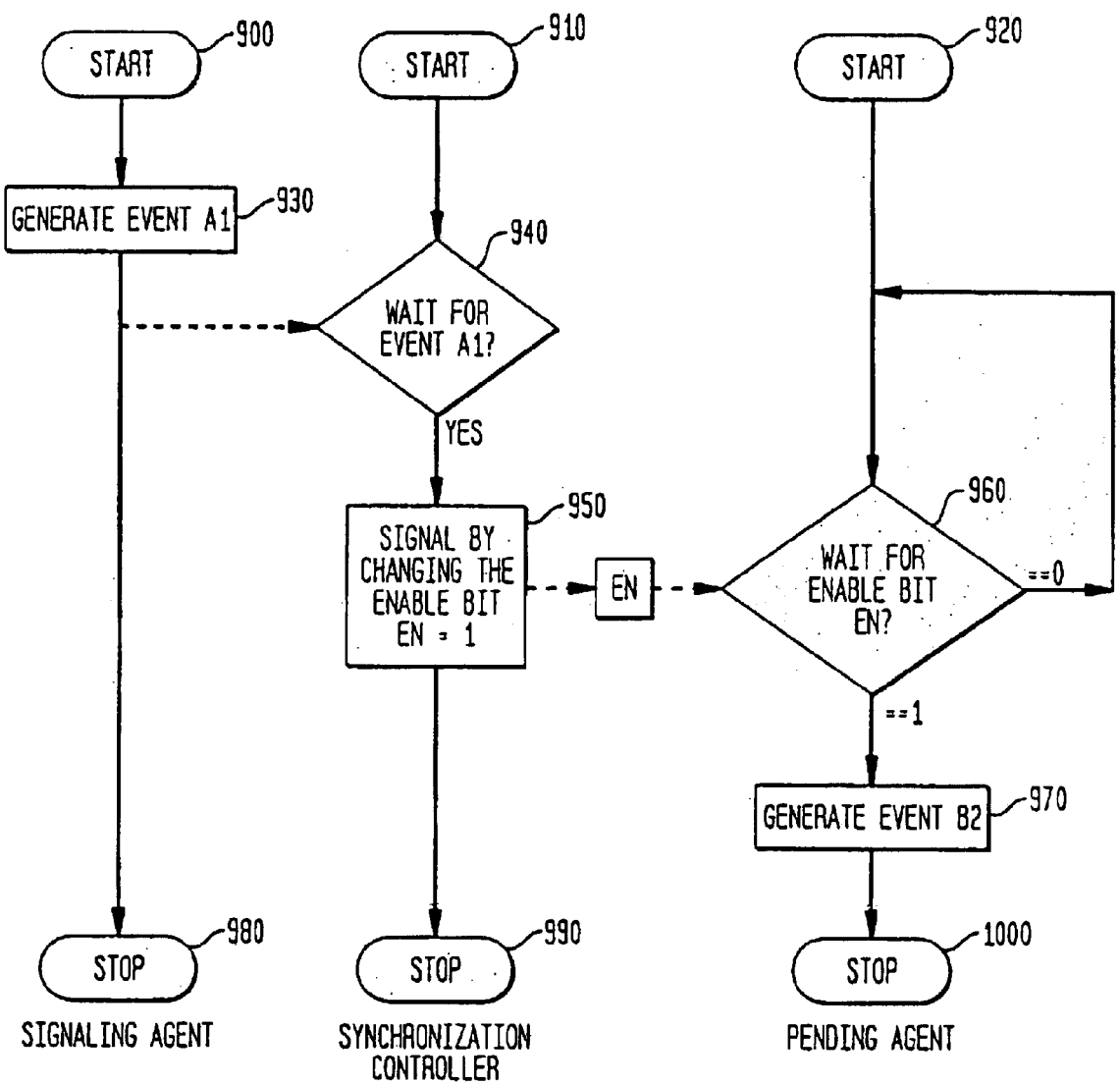
Figure 17:
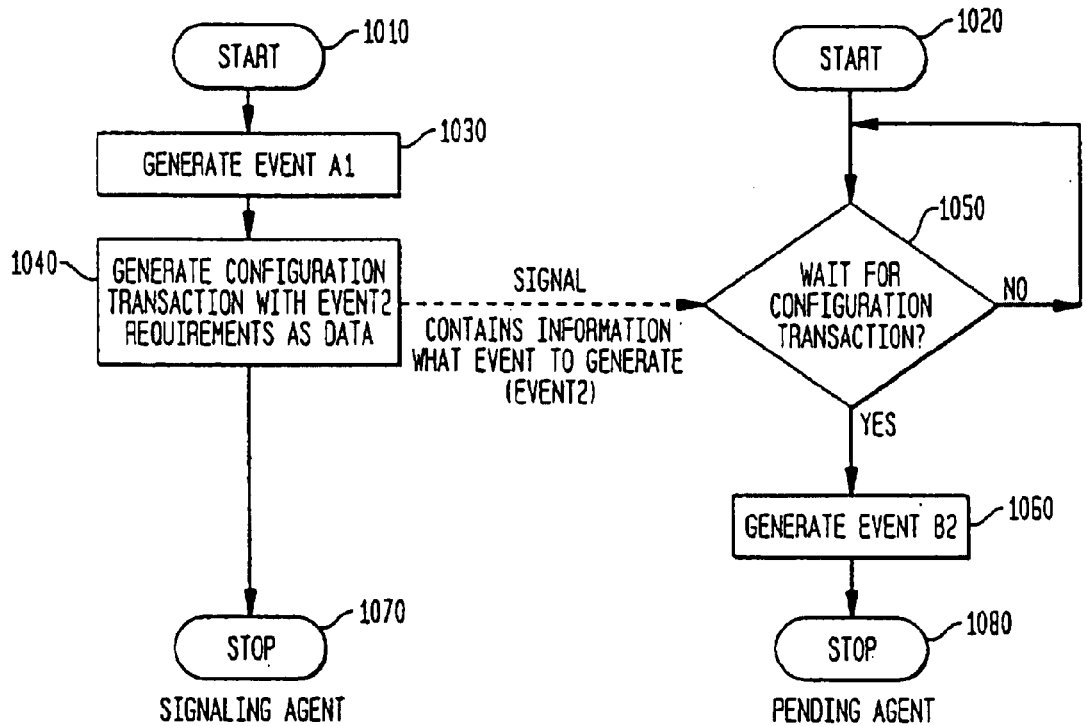
Figure 18:
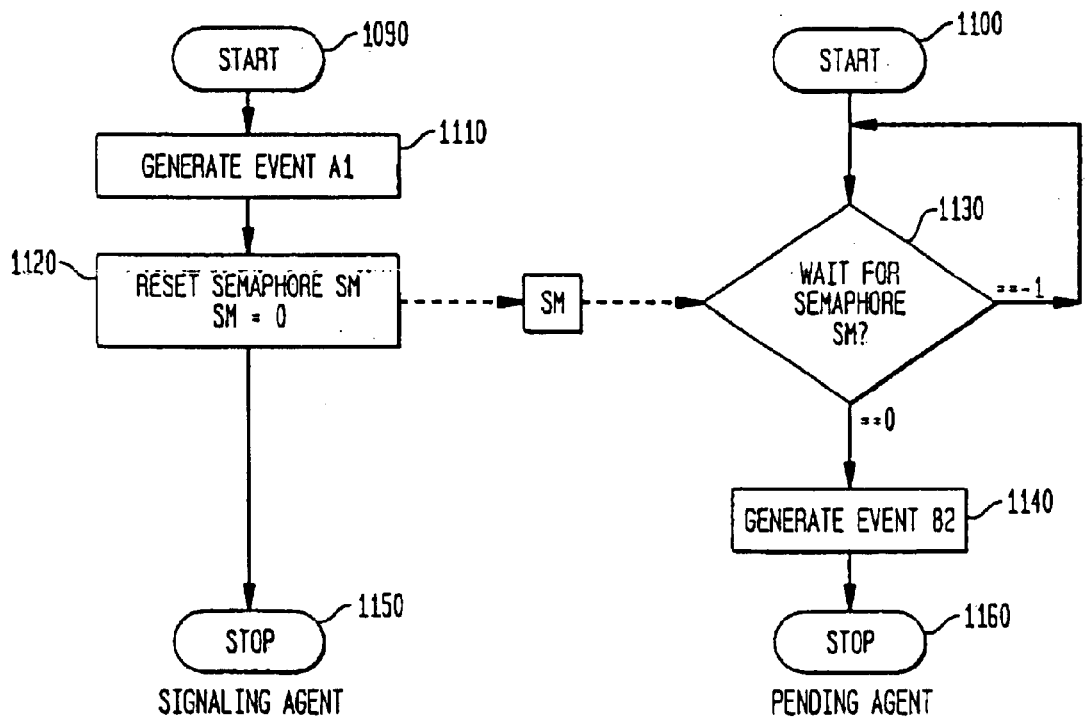
Figure 19:
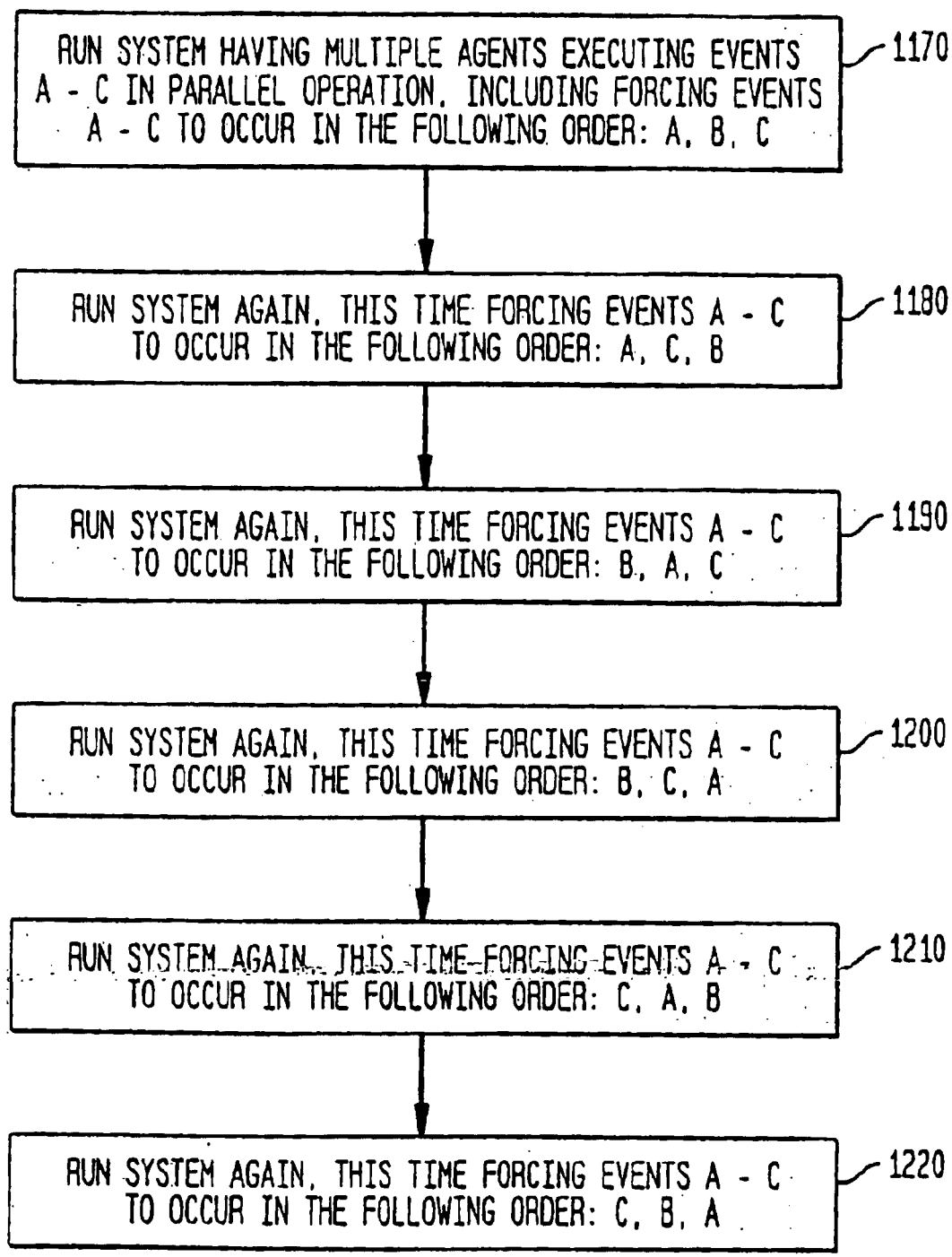

FIG. 14 comprises a preferred method for arbitration synchronization performed by a synchronization controller constructed and operative in accordance with a preferred embodiment of the present invention;

FIG. 15 is a simplified flowchart illustration of the Register method of synchronization presented in FIG. 10;

FIG. 16 is a simplified flowchart illustration of the Enable bit method of synchronization presented in FIG. 10;

FIG. 17 is a simplified flowchart illustration of the Configuration method of synchronization presented in FIG. 10;

FIG. 18 is a simplified flowchart illustration of the Semaphore method of synchronization presented in FIG. 10; and FIG. 19 is a simplified flowchart of a synchronization method in which a system having multiple agents executing several events in parallel operation is run repeatedly such that the several events are forced to occur in all possible orders.

Figure 13:
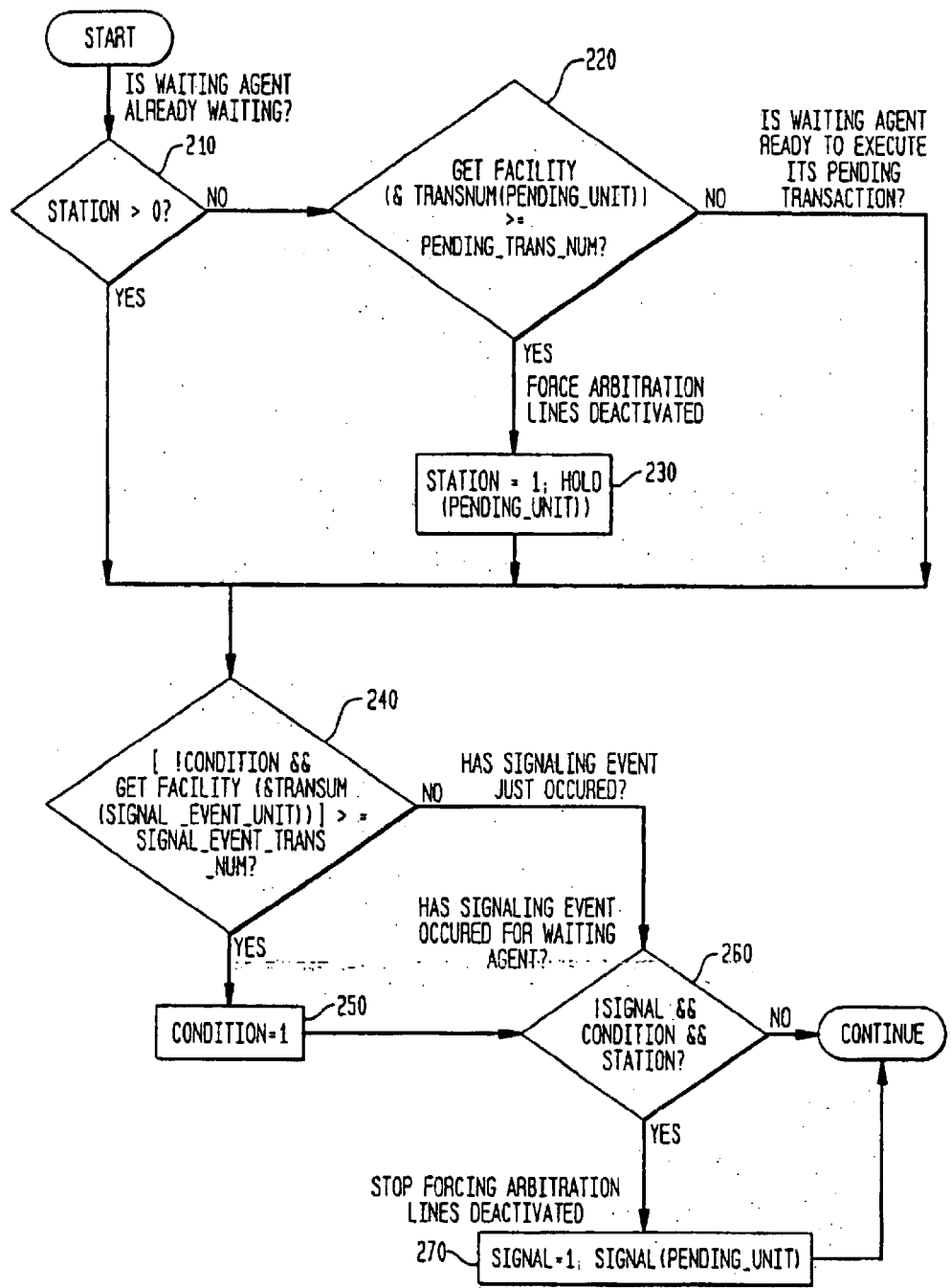
FIG. 13 is a simplified flowchart illustration of one cycle of the Bus arbitration method of synchronization presented in FIG. 10.

Appendix A is a computer listing of a preferred software implementation of a synchronization controller constructed and operative in accordance with a preferred embodiment of the present invention, and performing the synchronization control method of FIG. 13.

DETAILED DESCRIPTION OF THE PREFERRED EMBODIMENTS OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The foregoing description pertains to ordering mechanisms, including review of mechanisms forming part of an example automatic system test generator. It is appreciated that the applicability of the invention shown and described herein is not limited to the testing system described herein by way of example.

Figure 1:
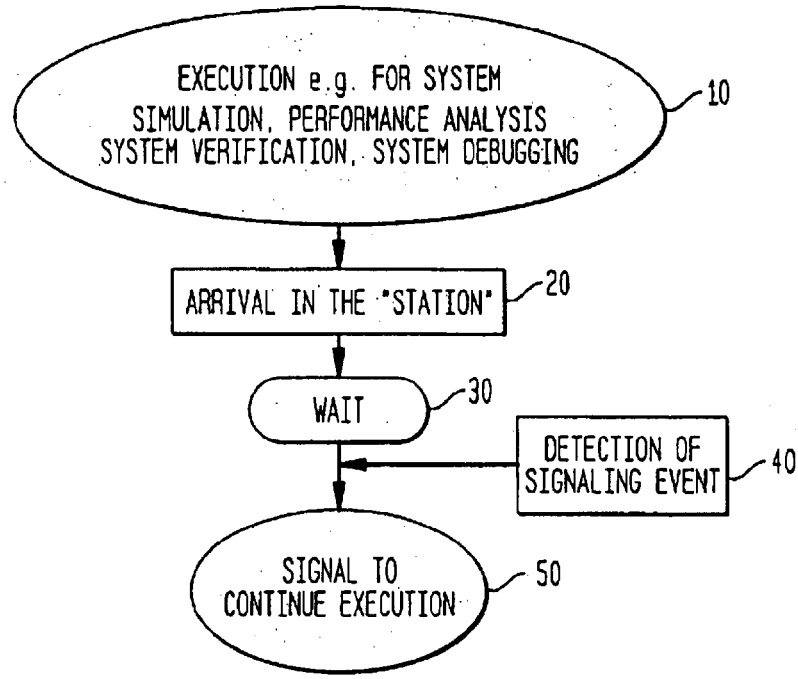
FIG. 1 is a simplified flowchart illustration of an execution scheme of a pending device, constructed and operative in accordance with a preferred embodiment of the present invention.

The minimal synchronization mechanism presented in this invention comprises the following steps, as shown in FIG. 1;

Step 20: The synchronization controller or waiting agent detects when the waiting agent is about to execute its pending transaction, i.e., the detection takes place between the completion of the waiting agent's previous transaction and the appearance of the pending transaction on the bus. This stage is henceforth referred to as "arrival in the station".

Step 30: The waiting agent is prevented from executing its pending transaction. This may be done by the SC or by the waiting agent itself. This step is henceforth referred to as "waiting in the station" or the wait phase.

Step 40: The SC or waiting agent detects when the signaling event occurs. This is also referred to as the signaling condition.

Step 50: The waiting agent is allowed to execute its pending transaction. This may be done by the SC itself or by the waiting agent itself. This step is also referred to as the signaling phase.

The above-described synchronization mechanism may be implemented in a system test generator.

The term "Station" is used herein to refer to the step of detecting the pending device's readiness. Thus, Steps 20 and 40 are checking activities, while Steps 30 and 50 are actions.

FIG. 1 shows the order of the above-described events. The waiting agent arrives in the station and enters the waiting phase. When the signaling event is detected, a signal is sent to release the waiting agent.

Of course, if the waiting agent arrives in the station when the signaling condition has already been fulfilled, the waiting agent might stay there 0 cycles, in which case it is termed a degenerated wait phase. In such a case the signal might be sent before the arrival to the station, immediately after the arrival, or it might never be sent.

Figure 2:
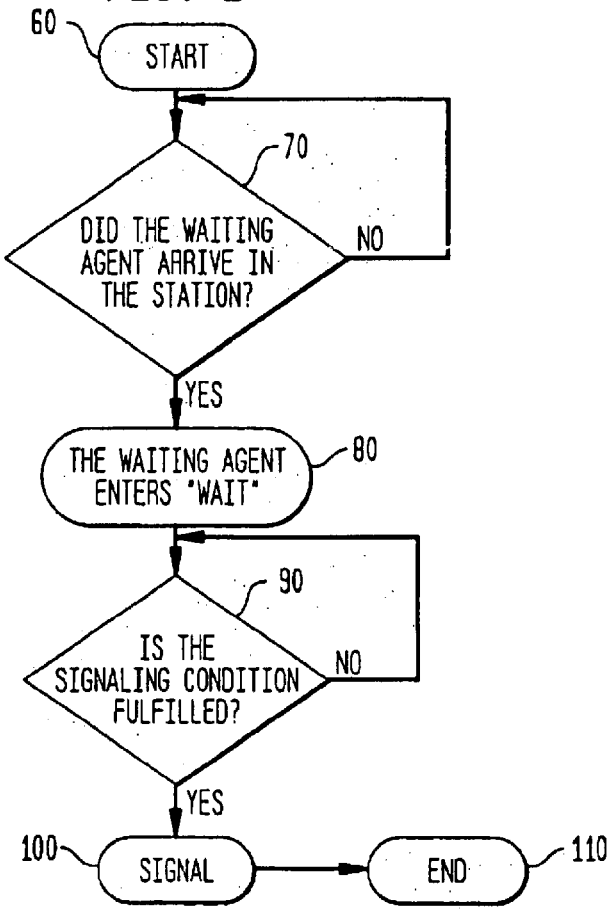
FIG. 2 is a simplified virtual flowchart illustration of a preferred synchronization controller constructed and operative in accordance with a preferred embodiment of the present invention.

The four phases of a preferred embodiment of a synchronization controller constructed and operative in accordance with a preferred embodiment of the present invention are depicted in the virtual flow chart illustration of FIG. 2. The flow chart is virtual in the sense that no single element executes all of it, and the order of execution is not necessarily as illustrated. Instead, its execution is typically distributed and performed in parallel.

Synchronization may be used to effect the following phenomena:

1. Transaction ordering: Two events have to occur in a given order.
2. Rendezvous: Several events have to start at the same time.
3. Mutual exclusion: Several events should not occur at the same time.

Synchronization can be used for building any of these functions.

Figure 3:
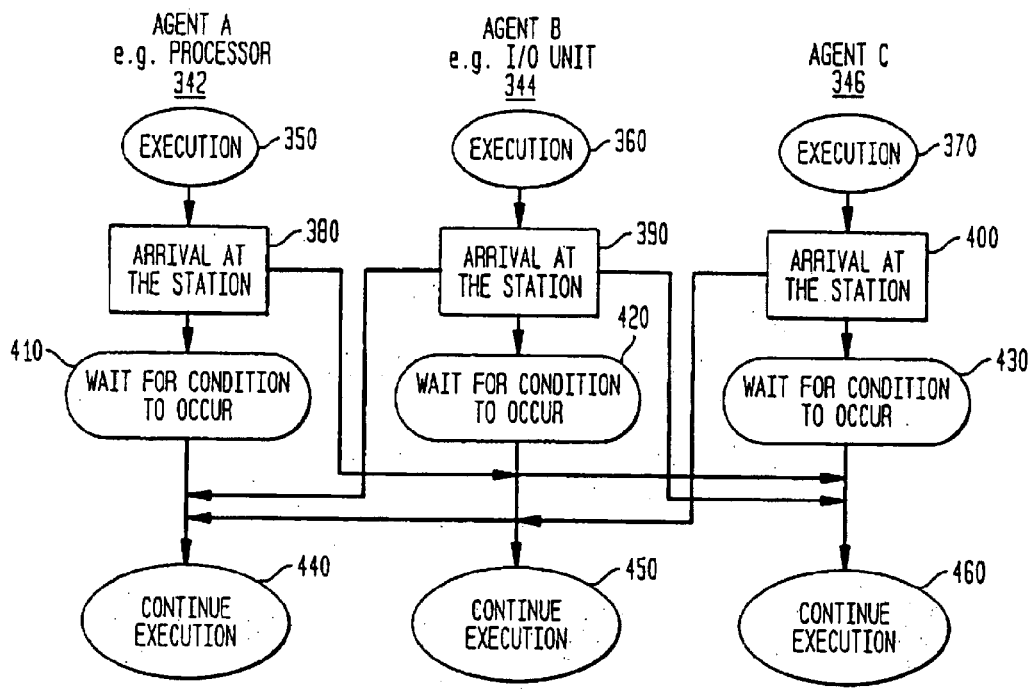
FIG. 3 is a simplified diagram of a rendezvous between three agents, operative in accordance with a preferred embodiment of the present invention.

FIG. 3 demonstrates a rendevous between 3 agents. Each agent arrives in its station and waits until the signaling condition is fulfilled. The signaling condition is the arrival of all three in their stations. There is a single condition for all the agents, but there are 3 synchronizations: one for each agent.

Figure 4:
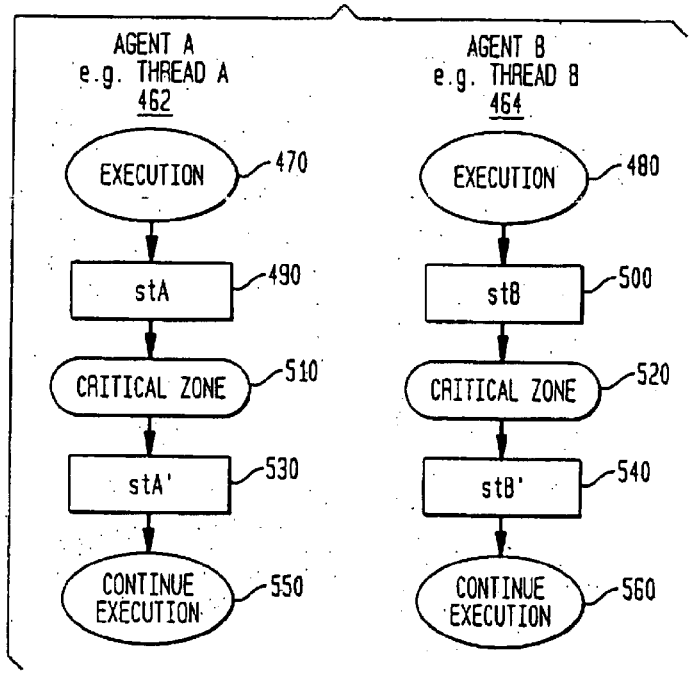
FIG. 4 is a simplified diagram of a mutual exclusion situation occurring between two agents, operative in accordance with a preferred embodiment of the present invention.
Figure 5:
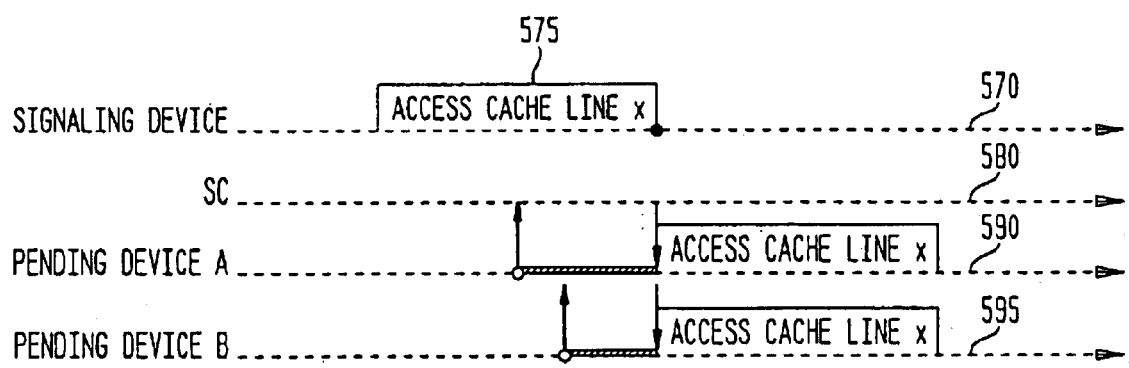
FIG. 5 is a temporal scheme of a transaction ordering in which arrival in a station occurs before a related signaling event.
Figure 6:
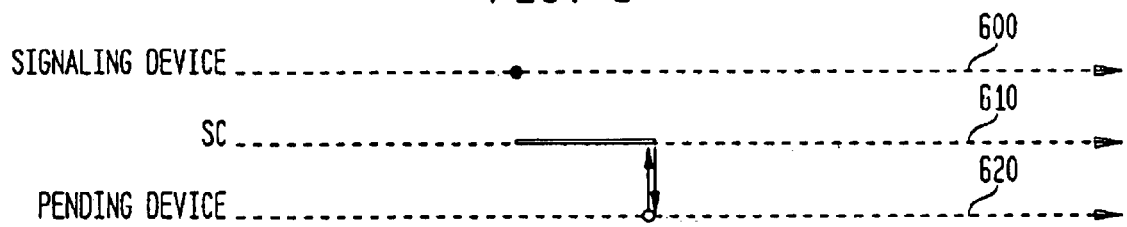
FIG. 6 is a temporal scheme of a transaction ordering in which arrival in a station occurs after a related signaling event.
Figure 7:
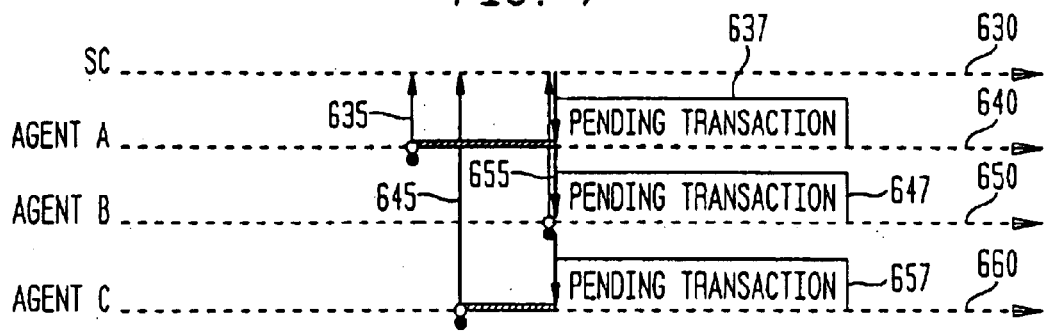
FIG. 7 is a temporal scheme for a rendezvous.
Figure 8A:
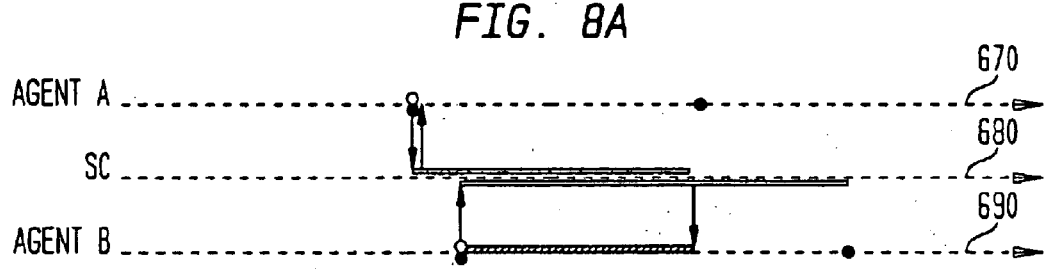
FIG. 8A is a temporal scheme for a mutual exclusion situation in which simultaneous critical access of two competing agents is prevented.
Figure 8B:
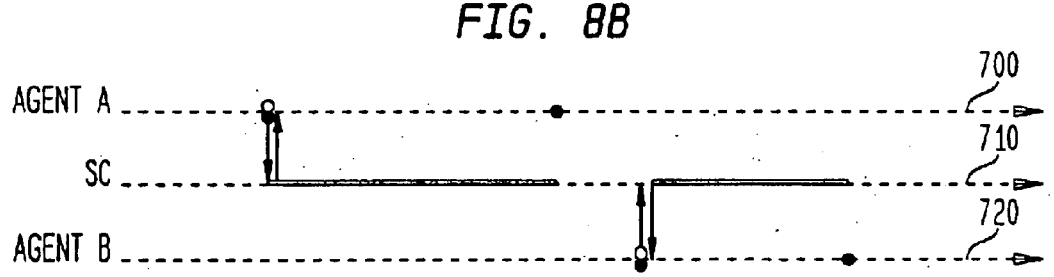
FIG. 8B is a temporal scheme for a mutual exclusion situation in which separate access is provided for each of two competing agents.
Figure 9:
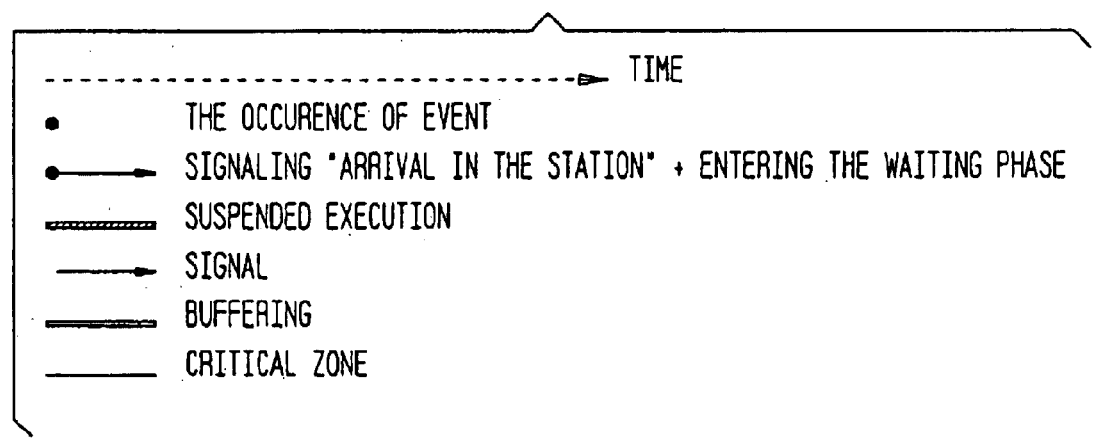
FIG. 9 is a key interpreting graphical notation used in FIGS. 5–8.

FIG. 4 illustrates a mutual exclusion of 2 agents. 4 synchronizations are used because the beginning and the end of the critical zone of each agent are separate stations. The signaling condition of agent A, in its first station (stA), is that agent B has not yet reached stB or it has already reached stB'. The signaling condition of agent B in stB is that agent A has not yet reached stA or it has already reached stA'. The signaling condition of A (B) in stA' (stB') is degenerated as are the wait and signal phases. FIGS. 5–9 describe the temporal behavior of the various synchronizations. FIGS. 5 and 6 show transaction ordering, FIG. 7 shows a rendezvous, whereas FIG. 8 shows mutual exclusion.

Note that the above synchronizations can be combined in various ways. e.g. in order to achieve tight snooping a rendezvous between the two agents should occur directly before the transaction ordering. This will ensure that the pending transaction happens very close in time after the signaling event.

Figure 12:
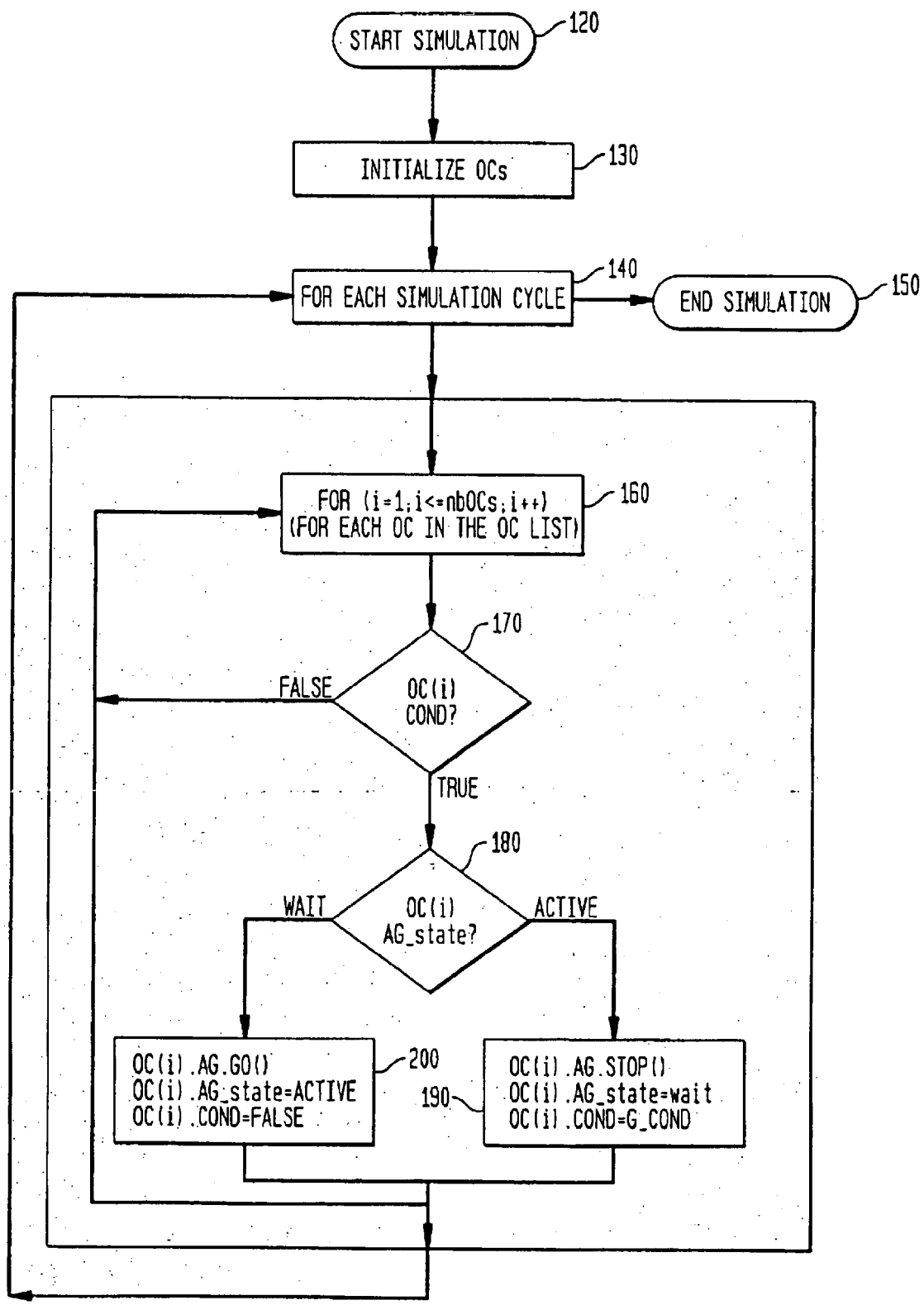
FIG. 12 is a simplified flowchart illustration of a preferred method of operation for a synchronization controller constructed and operative in accordance with a preferred embodiment of the present invention.

FIG. 12 is a simplified flowchart illustration of a preferred method of operation for a synchronization controller constructed and operative in accordance with a preferred embodiment of the present invention. In the flowchart of FIG. 12, input parameters are as follows:

AG—an agent in the test S_cond—condition to detect arrival in the station (step 1 of the invention)

G_cond—condition to detect signaling event (step 3 of the invention)

STOP( ) and GO( ) correspond to steps 30 and 50 of FIG. 1 respectively. S_cond and G_cond are preferably logic functions on events which occur on the simulated model during the simulation run.

Inner Structures and Variables:

Preferably, for each tuple (AG, S_cond, G_cond) received as input, a synchronization controller based on the flowchart of FIG. 12 builds an OC (order control) object and stores it in a list of OCs. The list contains nbOCs objects of type OC. OC(i) is an object OC stored in the list on position i, where i 1, . . . , nbOCs.

Each OC used by the SC program comprises:

AG—the agent;
AG_state—the state of the agent={ACTIVE/WAIT}, initialized to ACTIVE,
S_cond,
G_cond,
COND={S_cond, G_cond, FALSE} is a variable pointing to the respective condition to be evaluated. COND can point to S_cond, G_cond or FALSE and is initialized to S_cond.

Comparing FIGS. 2 and 12, it is noted that FIG. 12 illustrates a multiple-cycle synchronization in which (steps

130, 140, 160) multiple agents are synchronized at multiple intervention junctures. Steps 120, 150, 170, 190 and 200 of FIG. 12 correspond generally to steps 60, 110, 70, 80, 100 of FIG. 2 respectively.

Many variations of the above described synchronization mechanism may be employed such as, but not limited to, the following:

Station Detection (Step 20 of FIG. 1)—Variations

At least the following options exist for step 1, where the synchronization controller takes note of when the waiting agent is about to execute its pending transaction:

a. A waiting processor writes a non-zero value into a predefined register. The synchronization controller can then read this register and according to its value know when to prevent the waiting agent form executing its pending transaction (See TrigReg in Example 1 below (Tight Snooping)).

b. The synchronization controller can check for the completion of the waiting agent's previous transaction. This may be affected by out-of-order execution in the case of processors. For behaviorals, this could simply be the checking of the behavioral's current transaction number.

c. The waiting agent could execute a synchronization instruction such as PowerPC's eieio on the bus. This instruction should only be executed for notifying the synchronization controller that an agent is ready to wait. The synchronization controller could then monitor the appropriate bus for a successful end to the eieio transaction.

Signaling Event Detection (Step 40 of FIG. 1—Variations

One possible implementation for step 3, i.e., detecting the signaling agent's event might be the appearance of a given address on a given bus. Another example might be the memory controller's read buffers becoming full.

Wait and Signal—Methods: (Steps 30 and 50 of FIG. 1)—Variations

The SIGNAL can be driven by the SC or by a modeled device. The signal driven by the SC is the change of the value of a simulation signal (or of a set of simulation signals). The simulation signal could be a processor register, an enable bit (or enable action), or an arbitration signal. The testing system may also use SIGNALS sent by other devices:

(device: processor SIGNAL: changing the semaphore value)

(device: processor SIGNAL: configuration cycle)

The SIGNAL sent corresponds to the waiting method used by the device.

FIG. 10 is a table comparing synchronization control methods constructed and operative in accordance with five different embodiments of the present invention which differ mainly with respect to implementation of the "wait" and "signal" steps of FIG. 1. The methods of FIG. 10 include the following methods:

a) Register Method (FIG. 15)

Initialization: Each processor has a dedicated TrigReg register, used only for SC. Initially, its value is 0.

Wait: The waiting processor loops, waiting for its TrigReg register to be set to a certain value not equal to 0.

Signal: The SC changes the TrigReg register of the waiting processor to be the value it is waiting for.

Limitation: Processors only.

b) Bus Arbitration Method (FIG. 13)

Wait: The SC prevents the waiting agent from receiving arbitration on the bus by forcing its arbitration signal(s) de-asserted.

Signal: The SC stops de-asserting the waiting agent's arbitration signal(s), thereby allowing it to execute its pending bus transaction.

Limitation: Technical difficulties.

c) Enable Bit Method (FIG. 16)

Initialization: Used for behaviorals that have an enable bit for each transaction, i.e., if 0, the transaction cannot be executed, if 1, it can be executed. Initially, the enable bit for the pending transaction is set to 0.

Wait: Since the waiting behavioral's bit for its pending transaction is initially set to 0, it will not be able to continue.

Signal: The SC sets the behavioral's pending transaction's enable bit to 1, thereby enabling it to continue execution.

Limitation: Behaviorals with one enable bit per transaction only.

d) Configuration Method (FIG. 17)

Wait: This method is used for behaviorals that receive their commands via configuration transactions targeted to them. Without receiving a configuration transaction, the behavioral will not continue execution.

Signal: The signaling agent executes a configuration transaction that enables the waiting agent.

Limitation: Behaviorals/devices that support configuration transactions only. Very slow.

e) Semaphore Method (FIG. 18)

Initialization: Initially, the semaphore is set to −1.

Wait: Processor waits at a semaphore, i.e., loops waiting for a particular memory location to be 0.

Signal: Signaling agent releases semaphore, i.e., writes 0 to the particular memory location, thereby releasing the waiting agent from its loop.

Limitation: Processors only.

A preferred arbitration synchronization mechanism comprises the following steps, as shown in FIG. 14:

Step 300: The synchronization controller detects pending appearance of waiting agent's pending transaction on the bus.

Step 310: The synchronization controller then prevents the waiting agent from receiving arbitration on the bus by forcing its arbitration signal de-asserted. This prevents the waiting agent from executing any further transactions on the bus.

Steps 315–340: When the signaling event occurs, the synchronization controller stops de-asserting the arbitration signal of the waiting agent. This allows the waiting agent to be granted access to the bus, thereby allowing it to execute its pending bus transaction.

Comparing FIGS. 13 and 14, it is noted that steps 300, 310 and 315 of FIG. 14 correspond generally to steps 220, 230 and 240 of FIG. 13 respectively. Step 320 of FIG. 14 corresponds generally to steps 250, 260 and 270 of FIG. 13. Steps 330 and 340 are not steps executed by the synchronization controller and therefore do not have parallels in FIG. 13.

Arbitration synchronization may result in a risk of deadlock. Deadlock can occur since once the waiting agent is prevented from gaining arbitration to its bus, it is not able to access the bus for any reason, including reasons not connected to the actual synchronization. The prevention of deadlock is typically the responsibility of the test writer or automatic test generator.

Three example applications are now described:

EXAMPLE 1

Tight Snooping Between Two Processors

The first example of a test program is tight snooping between two processors. The aim of this scenario is for the following events to occur in sequential order, very close in time:

1. Processor A writes to address X from register Ra.

2. Processor B reads from address X into register Rb.

If the above two events occur in the required order, the final value of Rb is the value written by processor A. Often, contention on a memory address exposes a design bug. Note that this example could also be applied to tow threads on a single processor. In this case the register wait/signal method is used, as shown in FIG. 15.

EXAMPLE 2

Filling Up Read Buffers

Figure 11:
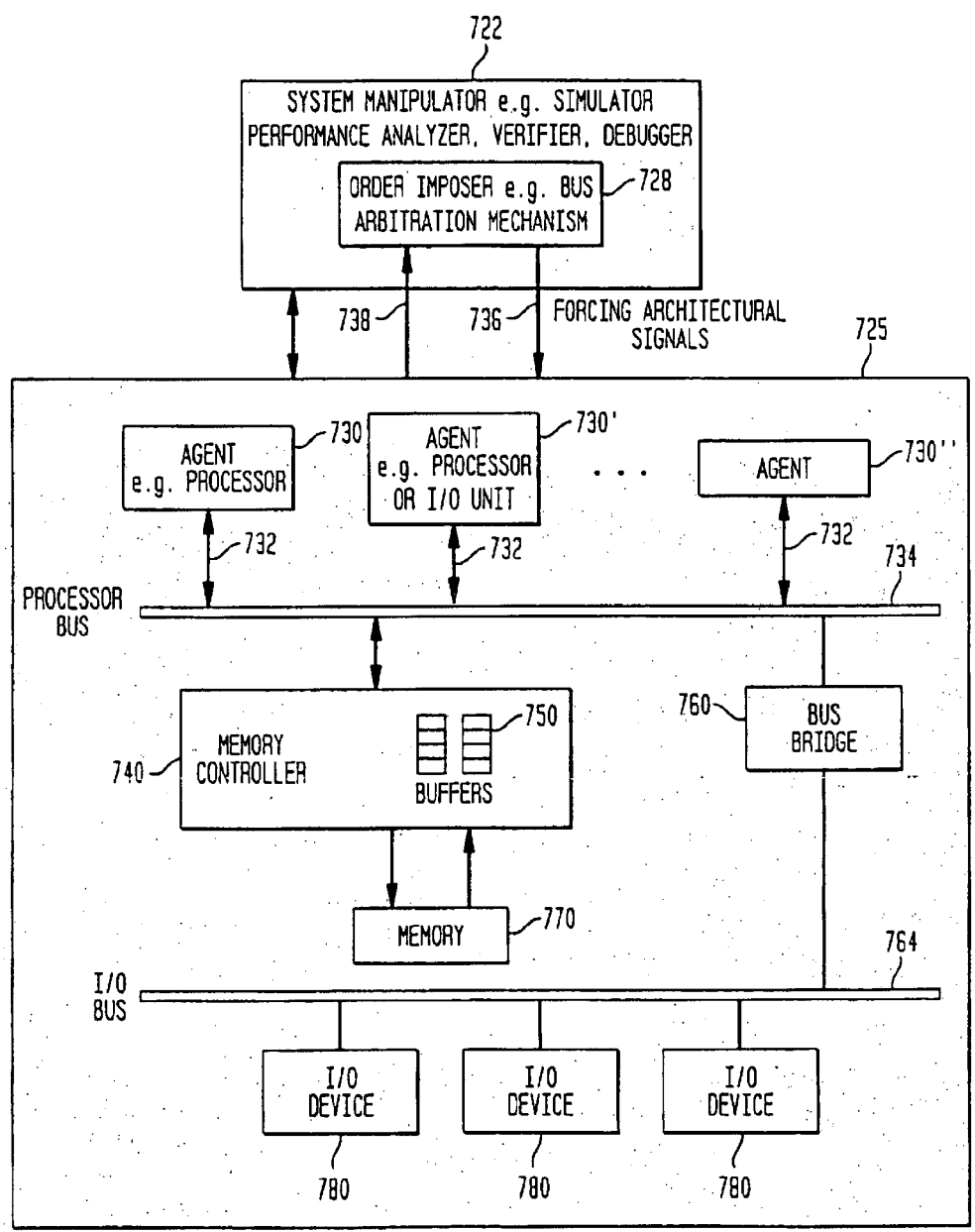
FIG. 11 is a simplified block diagram illustration of a system being tested.

In this example, a test program fills up a memory controller's read buffers. The partial system of FIG. 11 is used as an example, where the memory controller contains 8 read buffers.

In this scenario it is desired to fill up the 8 read buffers. In order to attain this, at least 8 agents (processors and I/O devices) are used to execute read requests to memory, while preventing the memory controller from satisfying any of the requests. Once the buffers are full, the memory controller can be allowed to reply. Filling up buffers often exposes design bugs. Note that this example could be used similarly to fill up a bus bridge's buffers.

EXAMPLE 3

Snooping Among Three Processors

The aim of this scenario is for one processor to write to an address before two other processors read from the same address, i.e., transaction 1 below should occur before both transactions 2 and 3 which may occur in any order. The final value of Rb and Rc should be that written by Processor A.

1. Processor A writes to address X from register Ra.

2. Processor B reads from address X into register Rb.

3. Processor C reads from address X into register Rc.

The three examples introduced hereinabove are now described in detail. Typically, the test components execute independently of one another unless synchronized via the synchronization controller.

EXAMPLE 1

Tight Snooping Between Two Processors, Processor A and Processor B (A's Write Occurs Before B's Read.)

In the following test description, TrigReg can be any pre-defined register that is not used in the rest of the test. The synchronization controller knows when to force Processor A and B's arbitration lines de-asserted by monitoring the value of ProcA.TripReg and ProcB.TrigReg, correspondingly. Thus, Processor A and B notify the synchronization controller when they are ready to wait.

Test Description:
    Processor A: Initially, ProcA.TrigReg==0.
    1. Set ProcA.TrigReg to be 1.
    2. Execute store to address X.
    Processor B: Initially, ProcB.TrigReg==0.
    1. Set ProcB.TrigReg to be 1.
    2.Execute load instruction to X.
    Synchronization Controller:
    1. If ProcA.TrigReg==1 and ProcB.TrigReg==0, force processor A's arbitration lines to be de-asserted.
    2. If ProcB.TrigReg==1, force processor B's arbitration lines to be de-asserted AND stop forcing arbitration lines of processor A de-asserted.

3. If transaction appears on system bus where address=X and master=Processor A, then stop forcing arbitration lines of processor B de-asserted.

Analysis:

This tight snooping example actually combines two simpler synchronizations, a rendezvous (several events which have to happen simultaneously) followed by a transaction ordering (two events having to occur in a given order). The signaling event for the rendezvous is that ProcB.TrigReg==1. The pending transaction for the rendezvous is processor A placing address X on the system bus. The signaling event for the transaction ordering is also processor A placing address X on the system bus. The pending transaction for the transaction ordering is processor B placing address X on the system bus.

EXAMPLE 2

Filling Up Read Buffers

In this example, the memory controller is prevented from satisfying the many read requests forwarded to it, as it cannot assert its data bus arbitration lines. Once the synchronization controller detects that the read buffers are full, it stops forcing the arbitration lines de-asserted.

Test Description:
    All processor and I/O agents (at least 8):
    1. Execute read transaction.
    Synchronization controller:
    1. Force memory controller's data bus arbitration lines to be de-asserted.
    2. When read buffers are full, stop forcing the memory controller's data bus arbitration lines de-asserted.
    Analysis:
    In this example, the signaling event is the read buffers becoming full. There are actually several pending transactions, viz., the memory controller providing the data for all the read transactions targeted to it. Note that there are actually several signaling agents that together cause the signaling event to occur.

EXAMPLE 3

Snooping Among Three Processors

In the following test description, TrigReg can be any pre-defined register that is not used in the rest of the test. The synchronization controller knows when to force Processor B and C's arbitration lines de-asserted by monitoring the value of ProcB.TrigReg and ProcC.TrigReg, correspondingly. Thus, Processor B and C notify the synchronization controller when they are ready to wait.

Test Description:
    Processor A:
    1. Execute store to address X.
    Processor B: Initially, ProcB.TrigReg==0.
    1. Set ProcB.TrigReg to be 1.
    2. Execute load instruction to X.
    Processor C: Initially, ProcC.TrigReg==0.
    1. Set ProcC.TrigReg to be 1.
    2. Execute load instruction to X.
    Synchronization Controller:
    1. If ProcB.TrigReg==1, force processor B's arbitration lines to be de-asserted.
    2. If ProcC.TrigReg==1, force processor C's arbitration lines to be de-asserted.
    3. If transaction appears on system bus where address=X and master=Processor A, then stop forcing arbitration lines of processor B and processor C de-asserted.

Analysis:

In this example, there are actually two waiting agents and two pending transactions. The signaling event is processor A placing address X on the system bus. The pending transactions are processor B placing address X on the bus and processor C placing address X on the bus.

In an experiment performed by Applicant, the arbitration synchronization method proposed herein was compared to a processor register polling method described above in the Summary of the Invention section. Each test simulated comprised at least 10 processor loads/stores including at least one tight snooping scenario between two processors. The tests were generated using an in-house automatic system test generator. The AS/400 simulation model used, consisted of two processors. Ten tests were run using each of the methods. The number of cycles between the two synchronized events for each test is shown in Table 1.

TABLE 1

Synchronization Method Timing Comparison

| Test Number | Arbitration Synchronization (No. cycles between events) | Register Polling Synchronization (No. cycles between events) |
| --- | --- | --- |
| 1 | 3 | 23 |
| 2 | 3 | 19 |
| 3 | 4 | 26 |
| 4 | 49 (*) | 62 (*) |
| 5 | 5 | 61 (*) |
| 6 | 3 | 30 |
| 7 | 49 (*) | 24 |
| 8 | 4 | 29 |
| 9 | 3 | 23 |
| 10 | 3 | 29 |

The table entries marked (*) represent tests in which there was an instruction fetch between the signaling agent's bus transaction and the waiting agent's next bus transaction. During random test generation, a large number of tests are generated. As long as the majority of these tests exercise the required behavior, tests not exercising the required behavior can be ignored. If these values are ignored, the arbitration synchronization method gave an average of 3.5 cycles difference, whereas the register polling method gave an average of 25.4 cycles. In other words, on average, the arbitration method performed 7 time better than the register polling method. In addition, the arbitration method often gave a difference of 3 cycles. This is the minimum number of bus cycles possible between transactions for the PowerPC 60x-like bus protocol used.

In the register polling synchronization mechanism, the processor executes several instructions before it is ready to start the pending bus transaction. However, in the arbitration synchronization mechanism, the only delay is in the time it takes for the bus arbiter to respond to the processor's bus request. The waiting agent, in particular a processor, can complete all the preparations for the instructions that follow the wait. In the case of a processor, the instruction to be triggered is already in the processor's Bus Interface Unit (BIU) by the time the processor is allowed to arbitrate for the bus. For this reason, the register polling synchronization mechanism is never able to achieve the minimum as achieved by the arbitration synchronization mechanism.

A particular feature of a preferred embodiment of the present invention is that it is independent of the agent type and of the system on which it is being used.

Compared to conventional systems in which each different pair of types of synchronizing devices needed to employ a different synchronization mechanism, this synchronization method can be used by processors, behaviorals, I/O devices and non-initiating system components.

The methods of the present invention can preferably be used on any system having an arbitration mechanism.

Other testing methods may have some of the preferred features detailed below, but not all of them. It is preferable to provide all of the following features in order to be able to support a random test generator that can predict expected results:

Preferred Features of the Present Invention:

1. The method is preferably implementation independent. The method only depends on the architectural description of the protocol bus interface. Different components (and implementations of those components) can use the same trigger (with the only change being the mapping of design signal names to architectural signal names). Furthermore, changes in the internals of the implementation, which occur frequently in a design life cycle do not impose changes in the generator.

2. Since the method uses a run-time synchronization controller during simulation it is preferably simulation execution timing independent. Therefore, it can be used to randomly generate tests which do not need any human intervention.

3. The method preferably does not change the behavior of the implementation under test (IUT). It uses the arbitration mechanism outside of the IUT to guide test outcome.

4. The method is preferably "Fast". It generates tests that have the "smallest possible" time delay between two bus events. For example the smallest possible time delay between two different bus transactions on the bus used in the experiment is 3 bus clocks. With this method tests were randomly created that achieved this actual minimum in simulation. This is a very strong advantage because other synchronization methods simply do not have it. For example, in the case of processors, if synchronization is done via processor instructions then the actual appearance of two different processor transactions on the 6xx bus is always much longer than the minimum allowed by the bus protocol.

5. The method is preferably "Strong". Using this synchronization method it is possible to predict the actual order of events in simulation. This allows the generation of expected results, even for randomly generated tests.

6. The method can preferably be used on system components that do not have instruction streams such as memory controllers and I/O controllers.

7. Preferably, the method is based on an understanding of the bus protocol beyond that required from synchronization using instruction streams. This is preferable even with respect to processors which perform out of order execution which a synchronization at the instruction stream level can be oblivious to, but which bus level synchronization cannot be. In addition, deadlocks are preferably prevented. An advantage of providing these features is that the developed synchronization can be used across a wide range of systems and components.

8. Short time delays between events may not be achieved deterministically, since instruction fetches and other such events typically preclude the ability to predict actual timing and allow only control of order. However, simulation of many randomly generated tests increases the probability of getting short delays in some of the tests.

FIG. 13 is a simplified flowchart illustration of a preferred method by which the synchronization controller of the present invention performs a single synchronization, which method is typically repeated each cycle for each synchronization. The code of this SC is presented in Appendix A. for each synchronization required, i.e. for each OC, the following integer variables are preferably maintained:

station—How long has the waiting agent been waiting?
condition—Has the signaling event occurred?
signal—Has the waiting agent been released to continue its execution?
pending_unit—The unit number of the waiting agent.
pending_trans_num—The transaction number of the pending transaction.
signal_event_unit—The unit number of the signaling agent.
signal_event_trans_num—The transaction number of the signaling transaction.

The flow-chart of FIG. 13 describes the flow for one synchronization for one cycle, i.e., the flowchart is repeated every cycle for every synchronization.

The trans_num array records the dedicated simulation variable used to monitor each agent's current transaction. For example, the implementation currently used for PowerPC processors is the CTR register. Before each processor executes a transaction, it typically increments its CTR register. The hold( ) routine forces the pending unit's address and data bus request and grant lines deactivated. Likewise, the signal( ) routine stops forcing the same lines deactivated. The actual simulation variables to use for the current transaction number and arbitration signals are defined in the test file which is then parsed by the generic synchronization controller.

The method of FIG. 13 automatically ensures that two events occur in test simulation with the least possible elapsed time between them. The difficulty overcome by the method is that it is not possible to predict how the hardware code will behave since the code constantly changes as the designers develop their design. The test shown and described herein is independent of the hardware implementation because the tools described herein work during simulation to set up conditions for a desired event sequence to occur. The advantage is that the tools do not have to predict the hardware code behavior since they can work using feedback from hardware behavior at simulation time. The methods shown and described herein are preferably generic enough to be applied to more than one pair of events and in different projects. The method of the present invention is no mere automation of what might be performed manually because a manual method involves multiple simulations with different tests whereas the method of the present invention typically requires only a single test simulation to get the same result.

FIG. 15 is a simplified flowchart illustration of the Registration method of synchronization presented in FIG. 10.

FIG. 16 is a simplified flowchart illustration of the Enable bit method of synchronization presented in FIG. 10.

FIG. 17 is a simplified flowchart illustration of the Configuration method of synchronization presented in FIG. 10.

FIG. 18 is a simplified flowchart illustration of the Semaphore method of synchronization presented in FIG. 10.

FIG. 19 is a simplified flowchart of a synchronization method in which a system having multiple agents executing several events in parallel operation is run repeatedly such that the several events are forced to occur in all possible orders;

Appendix A is a computer listing of a preferred software implementation of a a synchronization controller constructed and operative in accordance with a preferred embodiment of the present invention, and performing the synchronization control method of FIG. 13.

In order to use the synchronization controller of Appendix A with an arbitrary simulator, X, having the ability to interface to C code, the following steps may be performed:

1) The agents involved in the test are assigned running numbers starting from 0.

2) Each agent in the test provides a simulation signal that can be sampled to determine the current transaction number of the agent. For example, one of a processor's registers can be dedicated to this task. In this case, the processor's instruction stream is modified so that the dedicated register is incremented before each transaction.

3) The following arrays are initialized to contain the appropriate simulation signals for each agent involved in the test:

trans_num—see (2) above.

grant arrays—The simulation signals that control arbitration requests and grants to the bus.

4) The oc_table array is initialized to contain an element of type OrderControl for each synchronization required. One possible method is to initialize the array in an Init( ) function called before simulation begins.

5) the HandleOrderControl( ) function is called once every simulation cycle. For event-driven simulators, a simulation cycle can be simulated via use of the system clock.

6) Three functions are provided to interface to simulator, X, viz., GetSimSignal( ), StickSimSignal( ) and UnStickSimSignal( ). These functions return the current value of a simulation signal; force a simulation signal to take a certain value; and stop forcing a simulation signal to take a certain value, respectively.

The Synchronization Controller of Appendix A may alternatively be dynamically linked to MODELSIM/VHDL simulator. Its compilation is performed accordingly. During the linkage phase an entry point is defined for the SynchronizationController executable. The entry point is preferably an initialization function that does the following:

a) Sets up step (5) above, i.e., causes the simulator to call the HandleOrderControl( ) function after every clock cycle.

Creates an ModelSim/VHDL process for the HandleOrderControl( ) function.

processID process mti_CreateProcess (name,HandleOrderControl,0);

Tells the simulator to run this process each simulation cycle. The simulation cycle can be defined with the help of a CLK signal. The process will run each time the CLK signal becomes active.

mti_Sensitize (process,mti_FindSignal ("CLK"),MTI_EVENT);

b) Sets up steps (3) and (4) above, i.e., initializes required simulation signals and order control array.

Creates driver signals used in the HandleOrderConrol( ) function.

driverID drive_this_signal=mti_CreateDriver (signalID signal)

Initializes all the arrays used in the HandleOrdeControl( ) with the values defined for this particular simulation run.

Each time the HandleOrderControl( ) function is called, it uses functions to read the current state of the model and to change it. The following points explain how to implement step (6) above.

GetSimSignal( ). In the case of ModelSim/VHDL, the functions used are mti_GetSignalValue (signal), or
mti_GetArraySignalValue(signal)
depending on the type of the signal we need to drive.

StickSimSignal( ) forces the signal to a certain value. Depending on the logic different usage is needed to get this effect. The functions used are mti_SetSignalValue(signal,value),
mti_ScheduleDriver(signal,..)

UnStickSimSignal( ) stops forcing a signal to a certain value.

Depending on the logic different usage is needed to get this effect. The functions used are mti_SetSignalValue(signal,HIGH—IMPEDANCE/UNDEFINED/Z),
mti_ScheduleDriver(signal,..)

Details about the functions and their usage are described in the ModelSim/VHDL user manual, commercially available from Model Technology Inc.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting. It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

While the invention has been particularly shown and described with respect to preferred embodiments thereof, it will be understood by those skilled in the art that the foregoing and other changes in form and details may be made therein without departing form the spirit and scope of the invention.

```
* (C) Copyright IBM Corp. 1990, 1999             *
**************************************************************/
/**************************************************************/
* SYNCHRONIZATION CONTROLLER */
/**************************************************************/
/* Order Control state variables. non-zero after the event. */
typedef struct
{
    int station;        /* The number of cycles the waiting agent has been waiting. */
    int condition;      /* Signalling event occurred. */
    int signal;         /* Waiting agent has been released. */
    /* Waiting agent parameters */
    int pending_trans_num;
    int pending_unit;
    /* Signalling event parameters */
    int signal_event_trans_num;
    int signal_event_unit;
} OrderControl;
/* Simulation variable */
typedef struct
{
    char* symbol;
    int index,offset,size;
} SimSignal;
/* The following tables are initialized from the test file at the beginning */
/* of the simulation */
/* Table of order control synchronizations */
static OrderControl oc_table[MAX_CC];
static int num_of_ocs=0;
/* Simulation signals used during order control. */
static SimSignal trans_num[MAX_UNITS];
static SimSignal grant_dbg[MAX_UNITS];
static SimSignal grant_dbr[MAX_UNITS];
static SimSignal grant_abg[MAX_UNITS];
static SimSignal grant_abr[MAX_UNITS];
...
/**************************************************************/
/****           ORDER CONTROL HANDLING FUNCTIONS        ****/
/**************************************************************/
/* This function is executed once every simulation cycle. */
void HandleOrderControl( )
{
..
    /* Check which waiting agents are ready to execute their pending transactions. */
    for (i=0; i<num_of_ocs;i++)
        if (!oc_table[i].station)
                /* The pending unit for this order control has not yet reached its
                   pending transaction */
        {
            if (station(oc_table[i].pending_unit , cc_table[i].pending_trans_num))
            {
                oc_table[i].station=1;
                hold(&cc_table[i]);
            }
```

-continued

```
            else oc_table[i].station--;
    /* Check signalling event. */
    for (i =0;i<num_of_ocs;i+
        if (!oc_table [i].condition &&
                station(oc_table[i].signal_event_unit. oc_table[i].signal_event_trans_num))
                /* Signalling event has just occurred */
            oc_table[i].condition=1;
    /* Signal to those who are waiting and whose signalling events have occurred. */
    for (i=0;i<num_of_ocs;i++)
        if (!oc_table[i].signal && oc_table[i].condition && oc_table[i].station)
                /* Pending unit is waiting and signalling event has occurred */
            {
                oc_table[i].signal=1;
                signal (&oc_table[i]);
            }
}
int station(int unit , int transaction)
{
    ..
    /* There is a simulation variable in each unit that is dedicated to the
        current transaction number. In this implementation for CPUs,
        one register is dedicated to this purpose. */
    return GetSimSignal (&trans_num[unit])>=transaction;
}
void hold(OrderControl* oc)
{
    /* Force arbitration request and grant lines de-activated. */
    SticksSimSignal(&grant_abr[oc->pending_unit],1);
    SticksSimSignal(&grant_abg[oc->pending_unit],1);
    SticksSimSignal(&grant_dbr[oc->pending_unit],1);
    SticksSimSignal(&grant_dbg[oc->pending_unit],1);
}
void signal (OrderControl* oc)
{
    /* Release hold on arbitration request and grant lines. */
    UnSticksSimSignal(&grant_abr[oc->pending_unit],);
    UnSticksSimSignal(&grant_abg[oc->pending_unit],);
    UnSticksSimSignal(&grant_dbr[oc->pending_unit],);
    UnSticksSimSignal(&grant_dbg[oc->pending_unit],);
}
```

Having thus described our invention, what we claim as new, and desire to secure by Letters Patent is:

1. A synchronization method for the purpose of verification of a computer system having multiple agents able to operate in parallel, wherein each of the multiple agents executes specific transactions, said method comprising:
    running a simulation of said system; and
    forcing a given synchronization order between the multiple agents at one or more intervention juncture, during said simulation, by forcing specific transactions by at least a plurality of the agents to occur in a determined order.

2. A method according to claim 1 wherein the multiple agents comprise at least two agents accessing a single address at almost the same time and wherein the forcing step comprises forcing a predetermined one of said two agents to access said address before the other one of said two agents accesses said address.

3. A method according to claim 1 wherein said multiple agents comprise a plurality of processors.

4. A method according to claim 1 wherein said multiple agents comprise at least one processor and at least one I/O unit.

5. A method according to claim 1 wherein said multiple agents comprise a plurality of threads on an individual processor.

6. A method according to claim 1 wherein the multiple agents comprise at least three agents in parallel operation at least one intervention juncture.

7. A method according to claim 6 wherein the three agents comprise a first agent accessing an address on a cache line which accessing operation must occur before a second agent and a third agent access the same cache line generally simultaneously.

8. A method according to claim 1 wherein the multiple agents include:
    at least one signaling agents executing at least one signaling events; and
    at least one waiting agents executing at least one pending transactions,
    and wherein said forcing step comprises holding up operation of said at least one waiting agents until said at least one signaling agents execute said at least one signaling event.

9. A method according to claim 8 wherein said at least one signaling events comprises a plurality of signaling events and wherein said forcing step comprises holding up operation of said at least one waiting agents until said plurality of signaling events have been executed.

10. A method according to claim 8 wherein said at least one pending transactions comprises a plurality of pending transactions and wherein said forcing step comprises delaying said plurality of pending transactions until said at least one signaling events have been executed.

11. A method according to claim 8 wherein said at least one signaling agents comprise a plurality of signaling agents executing at least one signaling events and wherein said forcing step comprises holding up operation of said at least one waiting agents until said plurality of signaling agents executes said at least one signaling events.

12. A method according to claim 8 wherein said at least one waiting agents comprise a plurality of waiting agents and wherein said forcing step comprises holding up operation of said plurality of waiting agents until said at least one signaling agents execute said at least one signaling event.

13. A method according to claim 1 wherein the multiple agents in parallel operation are operative to fill at least one buffer of a bus bridge.

14. A method according to claim 1 wherein the multiple agents in parallel operation are operative to fill at least one buffer of a memory controller.

15. A method according to claim 1 wherein said running step comprises the step of simulating the system.

16. A method according to claim 1 wherein said running step comprises the step of conducting a performance analysis of the system.

17. A method according to claim 1 wherein said multiple agents participate in a plurality of events and said forcing step comprises the step of forcing the plurality of events to occur in all possible orders.

18. A synchronization method according to claim 1, wherein each of the multiple agents has a waiting state wherein the agent postpones execution until a predetermined event occurs.

19. A synchronization method according to claim 18, wherein the running step includes the step of simulating signaling events, and when one of the agents is in the waiting state, the agent stays in the waiting state until one of the signaling events occurs.

20. Synchronization apparatus for the purpose of verification of a computer system having multiple agents able to operate in parallel wherein each of the multiple agents executes specific transactions, said apparatus comprising:

a system manipulator operative to run a simulation of said system, the system manipulator including an order imposer operative to force a given synchronization order between the multiple agents at one or more intervention juncture, during said simulation, by forcing specific transactions by at least a plurality of the agents to occur in a determined order.

21. Apparatus according to claim 20 wherein said system manipulator comprises a system simulator operative to simulate the system.

22. Apparatus according to claim 20 wherein said system manipulator comprises a performance analyzer operative to conduct a performance analysis of the system.

23. Apparatus according to claim 20 wherein said system manipulator comprises a system verifier operative to verify the system.

24. Apparatus according to claim 20 wherein said system manipulator comprises a system debugger operative to debug the system.

25. A synchronization method for the purpose of verification of a computer system having multiple agents able to operate in parallel, said method comprising:

running a simulation of said system; and forcing a given synchronization order between the multiple agents at one or more intervention juncture, during said simulation, by controlling the timing of operations of said agents;

wherein the multiple agents comprise first and second agents, and the forcing step comprises forcing order between the first and second agents at a first intervention juncture; and wherein the multiple agents comprise third and fourth agents, at least one of which differs from said first and second agents, and the forcing step also comprises forcing order between the third and fourth agents at a second intervention juncture which is different from the first intervention juncture.

* * * * *